United States Patent
Yehudai

(10) Patent No.: US 9,614,710 B2
(45) Date of Patent: Apr. 4, 2017

(54) METHOD AND SYSTEM FOR COMMUNICATION DIGITAL DATA ON AN ANALOG SIGNAL

(71) Applicant: DOVE VOICE TECHNOLOGIES LTD., Raanana (IL)

(72) Inventor: Yehuda Yehudai, Raanana (IL)

(73) Assignee: DOVE VOICE TECHNOLOGIES LTD., Ra'anana (IL)

( * ) Notice: Subject to any disclaimer, the term of this patent is extended or adjusted under 35 U.S.C. 154(b) by 0 days.

(21) Appl. No.: 15/101,970

(22) PCT Filed: Dec. 5, 2013

(86) PCT No.: PCT/IL2013/051000
§ 371 (c)(1),
(2) Date: Jun. 6, 2016

(87) PCT Pub. No.: WO2015/083147
PCT Pub. Date: Jun. 11, 2015

(65) Prior Publication Data
US 2016/0308704 A1    Oct. 20, 2016

(51) Int. Cl.
*H04L 27/32* (2006.01)
*H04L 1/00* (2006.01)
*H04L 27/04* (2006.01)
*H04L 27/06* (2006.01)
*H04L 27/12* (2006.01)
(Continued)

(52) U.S. Cl.
CPC ............ *H04L 27/32* (2013.01); *H04L 1/00* (2013.01); *H04L 1/0033* (2013.01); *H04L 1/0041* (2013.01); *H04L 27/04* (2013.01); *H04L 27/06* (2013.01); *H04L 27/12* (2013.01); *H04L 27/14* (2013.01); *H04L 67/2823* (2013.01); *H04L 27/02* (2013.01); *H04L 27/10* (2013.01)

(58) Field of Classification Search
None
See application file for complete search history.

(56) References Cited

U.S. PATENT DOCUMENTS 3,621,396 A * 11/1971 Daugherty ............ H03M 3/024
375/251
3,919,641 A     11/1975 Kurokawa et al.
(Continued)

FOREIGN PATENT DOCUMENTS

CN           102223234         10/2011

OTHER PUBLICATIONS

Office Action for U.S. Appl. No. 13/910,255 dated Mar. 2, 2016.
(Continued)

*Primary Examiner* — David Bilodeau
(74) *Attorney, Agent, or Firm* — Pearl Cohen Zedek Latzer Baratz LLP

(57) ABSTRACT

A method for transmitting digital data on an analog signal is disclosed, which may include modulating-amplitude or frequency of the analog signal In a manner that includes representing digital bits of the digital data as combinations of periodic waveforms of low, medium and high levels of amplitude, if modulating the amplitude of the analog signal, or representing digital bits of the data as combinations of periodic waveforms of low, medium and high levels of frequencies. If modulating the frequency of the analog signal.

19 Claims, 11 Drawing Sheets

(51) Int. Cl.
*H04L 27/14* (2006.01)
*H04L 29/08* (2006.01)
H04L 27/02 (2006.01)
H04L 27/10 (2006.01)

(56) References Cited

U.S. PATENT DOCUMENTS

| | | | |
|---|---|---|---|
| 5,838,797 | A | 11/1998 | Iwasaki |
| 7,644,338 | B2 | 1/2010 | Park et al. |
| 9,172,536 | B2 | 10/2015 | Lu et al. |
| 2002/0146079 | A1* | 10/2002 | Al-Khatib ............... H04L 27/34 375/261 |
| 2005/0041760 | A1 | 2/2005 | Yousef |
| 2005/0094745 | A1* | 5/2005 | Miyanaga ............... H04L 27/06 375/320 |
| 2007/0088553 | A1* | 4/2007 | Johnson ................. G06F 3/162 704/257 |
| 2010/0115375 | A1 | 5/2010 | Shen et al. |
| 2011/0141918 | A1* | 6/2011 | Li ............................ H04J 3/00 370/252 |
| 2012/0320442 | A1* | 12/2012 | Gabory ............... H04L 27/2096 359/238 |

OTHER PUBLICATIONS

Find Office Action for U.S. Appl. No. 13/910,255 dated Jul. 6, 2016.
International Search Report for PCT application No. PCT/IL2013/051000 dated Mar. 30, 2014.
Office Action for U.S. Appl. No. 13/910,255 dated Dec. 7, 2016.

* cited by examiner

METHOD AND SYSTEM FOR COMMUNICATION DIGITAL DATA ON AN ANALOG SIGNAL

CROSS-REFERENCE TO RELATED APPLICATIONS

This application is a National Phase of International Patent Application No. PCT/IL2013/051000, filed Dec. 5, 2013, which is hereby incorporated by reference.

FIELD OF THE INVENTION

The present invention relates to data transmission. More specifically, the present invention relates to method and system for communication of digital data on an analog signal.

BACKGROUND

Encoding is a process in which data from a source is converted by an encoder into a signal that is transmitted. When the transmitted signal is received a decoder is used to decode the signal and obtain the original data.

There are three types of encoding (and corresponding decoding) techniques: encoding digital data into analog signals (e.g., modem), encoding digital data into digital signals (e.g., wired Local Area Network—LAN), and encoding analog data into digital signals (e.g., codec).

Historically, communication systems were originally based on analog signalling. Analog signalling is very suitable for transmitting speech (e.g., telephone). However, with the increased use of computers that are based on digital signalling, the need to communicate between remote devices, and the availability of analog communication infrastructure (telephone networks) digital to analog encoding was introduced to facilitate transmission of digital data over analog networks. For that aim, a device was developed to intermediate between digital devices (computers) and analog systems (telephone systems) that was named modulator/demodulater (modem). A modem receives a digital signal and modulates it into an analog signal that may be transmitted over an analog communication network, to a destination where another modem demodulates the analog signal back to its original digital form.

In analog transmission a transmitter uses a carrier signal (typically a high frequency signal) to serve as a carrier of the encoded signal. Analog encoding typically involves amplitude modulation (AM), where the amplitude of the carrier signal is modulated in a specific manner, frequency modulation (FM), where the frequency of the carrier signal is modulated in a specific manner, phase modulation, where the phase of the carrier signal is modulated, and quadrature modulation, which uses two carrier signals and combines amplitude and phase modulation to increase the volume of transmitted data without having to increase bandwidth.

SUMMARY

There is thus provided, in accordance with embodiments of the present invention, a method for transmitting digital data on an analog signal. The method may include modulating amplitude or frequency of the analog signal in a manner that includes representing digital bits of the digital data as combinations of periodic waveforms of low, medium and high levels of amplitude, if modulating the amplitude of the analog signal. The method may include representing digital bits of the data as combinations of periodic waveforms of low, medium and high levels of frequencies, if modulating the frequency of the analog signal.

According to some embodiments, "1" may represented by a change in the amplitude or frequency levels in a first direction, whereas "0" may be represented by a change in the amplitude or frequency levels in a second direction which is opposite to the first direction.

In some embodiments the method may further include transcoding the digital data that includes converting each bit of the digital data into two bits. The transcoding may include converting "0" to "01" and converting "1" to "10".

The method may further include arranging the digital data in packets, each of the packets including a payload and FEC information. In some embodiments the method may further include arranging the digital data in packets and adding a synchronization preamble to each packet of the digital data.

In some embodiments of the present invention the method may include representing the preamble in a uniquely distinct modulation pattern. In some embodiments the uniquely distinct modulation pattern may include a representation symbol of a distinctly different amplitude than the low, medium and high levels of amplitude, or a distinctly different frequency than the low, medium and high levels of frequency. In some embodiments the uniquely distinct modulation pattern may include a sequence of bits that is unlikely to occur in the representation of the digital data.

According to some embodiments the method may further include demodulating the modulated analog signal to extract the digital data.

There is also provided, according to some embodiments of the present invention a method for retrieving digital data that was transmitted on an analog signal whose amplitude or frequency was modulated according to embodiments of the present invention. The retrieving method may include demodulating the modulated analog signal to extract the digital data.

In some embodiment the retrieving method may further include analysing and fixing errors in the extracted data. In some embodiments the retrieving method may include identifying and classifying the errors using a forward looking window function. In some embodiments the retrieving method may also include guessing missing or erred bit content in a packet of the extracted data, fixing the packet accordingly and performing a validity check of the fixed packet. In some embodiments the validity check is based on FEC information.

According to some embodiments the retrieving method may include estimating channel response over time to different frequencies of the received signal, and using a filter, filtering the modulated analog signal to compensate for distortion based on the estimated channel response.

In some embodiments the method may include receiving a modulated known reference sequence, generating a prediction modulation of the known reference sequence, performing a comparison of the received modulated known reference sequence with the prediction modulation, and updating characteristics of the filter based on the comparison.

In some embodiments the method may include determining successful receipt of a retrieved packet or a part thereof of the modulated data, remodulating the retrieved packet or a part thereof, performing a comparison of the retrieved packet with the remodulated retrieved packet, and updating characteristics of the filter based on the comparison.

Some embodiments of the present invention provide for a modulator, a demodulator and a modem—all configured to perform methods according to some embodiments of the present invention.

There is also provided, according to some embodiments, a transaction method for performing a secured transaction between a first device and a second device, at least one of which is a mobile communication device. The method may include communicating authentication information relating to the transaction between the first device and second device or between any of the first or second device and a server. The transaction method may include a communication method according embodiments of the present invention.

In some embodiments the transaction method may include using bidirectional communication, wherein for each direction of communication a unique key is used. In some embodiments the bidirectional communication is full duplex communication.

BRIEF DESCRIPTION OF THE DRAWINGS

In order to better understand the present invention, and appreciate its practical applications, the following Figures are provided and referenced hereafter. It should be noted that the Figures are given as examples only and in no way limit the scope of the invention. Like components are denoted by like reference numerals.

DETAILED DESCRIPTION

Figure 1A:
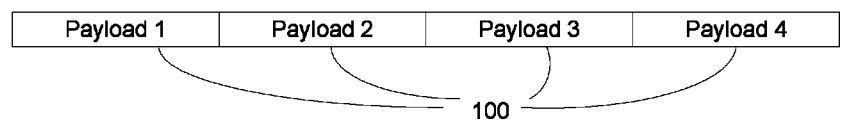
FIG. 1A illustrates segmentation of raw digital data input into chunks of data, according to embodiments of the present invention.

In the following detailed description, numerous specific details are set forth in order to provide a thorough understanding of the methods and apparatus. However, it will be understood by those skilled in the art that the present methods and apparatus may be practiced without these specific details. In other instances, well-known methods, procedures, and components have not been described in detail so as not to obscure the present methods and apparatus.

Although the examples disclosed and discussed herein are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method examples described herein are not constrained to a particular order or sequence. Additionally, some of the described method examples or elements thereof can occur or be performed at the same point in time.

Unless specifically stated otherwise, as apparent from the following discussions, it is appreciated that throughout the specification, discussions utilizing terms such as "adding", "associating" "selecting," "evaluating," "processing," "computing," "calculating," "determining," "designating," "allocating" or the like, refer to the actions and/or processes of a computer, computer processor or computing system, or similar electronic computing device, that manipulate, execute and/or transform data represented as physical, such as electronic, quantities within the computing system's registers and/or memories into other data similarly represented as physical quantities within the computing system's memories, registers or other such information storage, transmission or display devices.

A data transmission method according to embodiments of the present invention includes a modulating aspect at a transmitting end and demodulating aspect at a receiving end.

Transmission methods and systems, according to some embodiments of the present invention, are designed to convey digital data converted to analog symbols carried by an analog signal. In some embodiments of the present invention the analog signal is an audio channel, and in more specific embodiments, a voice channel. Methods and systems according to some embodiments of the present invention may be applied to any voice channel or a voice interface (including, but not limited to, landline, Public Switched Telephone Network—PSTN, Global System for Mobile communications—GSM, Code Division Multiple Access—CDMA, Bluetooth, Voice Over IP—VoIP, microphone and speakers). While some voice channels are far from being ideal for data transmission, some embodiments of the present invention provide a unique method to utilize practically any voice channel for digital data transmission. GSM voice channel, for example, is a narrow-band (300-3400 Hz) channel, a fact that limits its achievable data rates. GSM voice codecs used to compress voice encompass a memory of previously processed samples. This memory is used to calculate its current samples output—this feature increases the codecs compression ratio on the expense of causing distortions. These codecs are adaptive and keep changing their parameters during a call which makes it hard to predict their behavior. Additional GSM voice optimizations like Voice Activity Detection—VAD, Discontinuous Transmission—DTX, Comfort Noise Generation—CNG, Automatic Gain Control—AGC, Eco Cancellation—EC and Active Noise Cancellation—ANC also introduce distortions. An end-to-end voice call path may traverse a heterogeneous set of networks links thereby making the voice channel unpredictable. Errors frequently encountered by the GSM voice channel include: flips, insertions, deletions. This and other distortion sources, when addressed by conventional data modulation techniques sometimes render transmitted data unrecoverable and thus useless.

Some embodiments of the present invention use a voice channel or any voice interface for data transfer—optionally encrypted, possibly adding more functionality on top of an already existing voice communication channel. Digital data transmission according to some embodiments is "transparent" with respect to the typical users of the voice channel and does not impose additional infrastructure requirements.

At a transmitting end, modulation is performed by a modulator, according to some embodiments of the present invention, and includes a data formation step and a data representation step.

In the data formation step, before translating a raw data input into digital waveform symbols, the input data undergoes some manipulation, which may include segmentation—dividing the raw data input stream into chunks of a predetermined size to be used as payloads 100 of transmitted data packets (see FIG. 1A). In some embodiments of the present invention the predetermined size of the data chunks would be a number of bits which is a multiple of 8, so that the payload represent integer amount of bytes. In some embodiments of the present invention a header may be added at the beginning of each of the data packets. In some embodiments of the present invention a variable sized payload may be used.

Figure 1B:
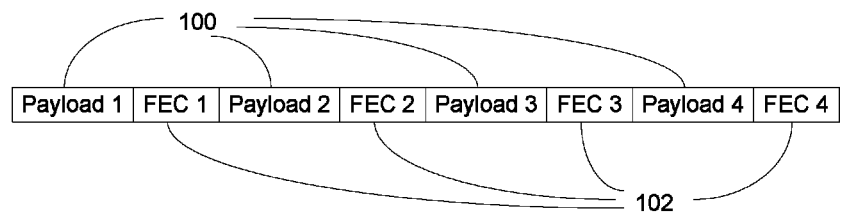
FIG. 1B illustrates adding FEC information to segmented digital data input, according to embodiments of the present invention.

Additional manipulation may include adding error correction information. In some embodiments of the present invention forward error correction may be applied. A forward error correction (FEC) may be calculated for each payload and the FEC information 102 (see FIG. 1B) may be added to each packet.

The FEC information may be used at the receiver end to identify errors, and if possible correct them, thus minimizing data loss. The type of FEC and amount of bits used per payload determines the maximal amount of fixable errors. In general, the more bits are included in the FEC information associated with a payload, the less probability of error in packet validation, and thus the more errors may be detected and fixed. However, this has its toll on the bandwidth and hence less throughput is possible.

Figure 1C:
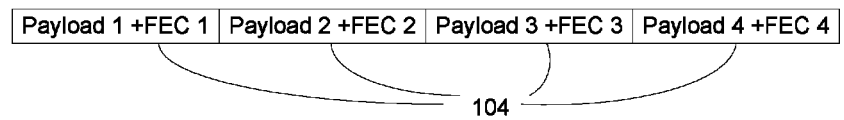
FIG. 1C illustrates interleaving payloads and FEC information, according to embodiments of the present invention.

According to some embodiments of the present invention, the processing from this step onwards is carried out on the payload and FEC bits interleaved, forming a single data packet 104 (see FIG. 1C). The purpose of interleaving is to protect the data from a sudden burst of errors which may occur during transmission. Suppose several errors occur in a single burst, if this happens over the error correction information, it would be very hard to reconstruct the original data. Shuffling the bits of data and error correction in a predetermined manner between the modulator and demodulator ensures that these burst errors would actually affect the whole packet in an evenly distributed manner. In fact by applying the inverse action to interleaving—de-interleaving—in the demodulator, the burst errors would be transpositioned and would spread evenly over the whole packet. Another option for interleaving is shuffling of bits from adjacent packets in a known order; this may also contribute to data transfer robustness in case a certain packet is unrecoverable. In case of utilizing the later kind of interleaving it should preferably be done prior to adding FEC information to the payloads.

Figure 1D:
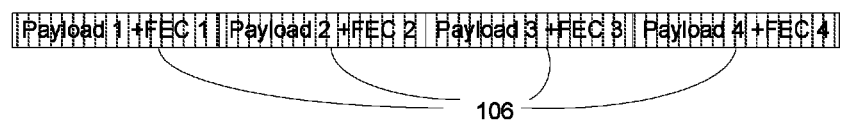
FIG. 1D illustrates data chunks of interleaved and stuffed payloads and FEC information, according to embodiments of the present invention.

In some embodiments of the present invention the interleaved payloads and FEC information would undergo stuffing. Stuffing is aimed at preventing certain sequences of data patterns by recognizing those patterns in the interleaved payload and FEC data stream and inserting "pattern-breaking" control bits in between the original interleaved payload and FEC bits in order to break these undesired patterns. For example long series of consecutive zeros and consecutive ones are undesired since such series make it harder for the demodulator to address deletion or insertion errors when such errors occur, and so a stuffing rule may prescribe scanning the data stream for a series of consecutive ones or zeros of a predetermined maximal length (e.g., 5) and inserting after such series of ones a zero bit (or a one bit after a series of zeros). The maximal number of consecutive zeros or ones allowed would typically be determined by a determined maximal amount of fixable errors. FIG. 1D illustrates data chunks 106 of interleaved and stuffed payloads and FEC information.

Figure 1E:
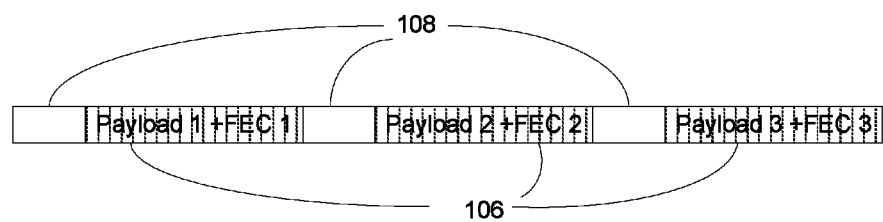
FIG. 1E illustrates data chunks of interleaved and stuffed payloads and FEC information with a preamble added to each data chunk, according to embodiments of the present invention.

Next, synchronization information is added to each packet as a preamble 108 of that packet (see FIG. 1E). The synchronization information is designed to be distinct and easily recognized within the data stream. For example, in some embodiments of the present invention, a uniquely distinct modulation pattern which is unlikely to occur in the modulated data sent may be used as a synchronizing signal. For example, in light of the stuffing process (see explanation above) which "breaks" long sequence of data bits all having a value of zero's or all having value of ones by inserting a bit with an opposite value, a plurality of consecutive ones, followed or preceded by a plurality of zeros (e.g. same as the number of consecutive ones or other plurality of zeros) while at least one number of these pluralities of zeros and ones is longer than the predetermined maximal length (e.g., in the example given hereinabove at the stuffing process if one of the pluralities has 6 or more consecutive zeros or ones) may be used as a synchronizing signal, as it is unlikely such combination of zeros or ones will ever appear in the transmitted data stream that has undergone stuffing. In some other embodiments of the present invention the preamble may include a distinctly different (high or low) level of amplitude (frequency), rather then a special pattern of data, which would only serve as a synchronizing signal.

According to some embodiments of the present invention, the data chunks—each comprising a preamble followed by an interleaved and stuffed payload and FEC information—are transcoded by applying the following transcoding rule:

$$\begin{Bmatrix} 0 \rightarrow 01 \\ 1 \rightarrow 10 \end{Bmatrix}$$

That is, each zero (0) is transcoded into a two-digit sequence of zero followed by one (01), and each one (1) is transcoded into a two-digit sequence of one followed by zero (10).

Transcoding, although reducing throughput, adds robustness and homogeneity to the transmitted data which is susceptible to various errors. Transcoding has also an important role in the identification of insertion/deletion and flip errors. In case of using a distinct different level of amplitude as a synchronizing signal for introducing preamble bits another rule may be applied: P→20 where P represents a preamble bit and the 2 in "20" represents a substantially different amplitude (much higher in this example).

Figure 2A:
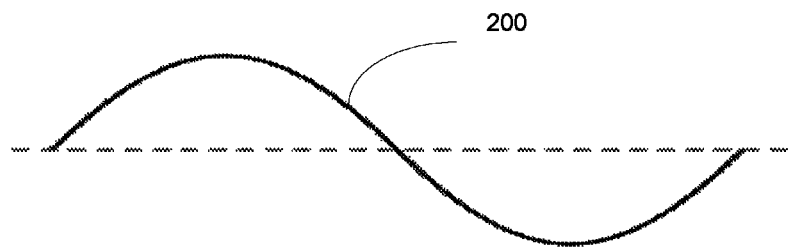
FIG. 2A illustrates a periodic sinusoidal waveform, for use as an analog representation symbol of a bit, according to some embodiments of the present invention.

According to some embodiments of the present invention, in the data representation stage, each bit of the data emerging from the data formation stage is converted into a sinusoidal waveform symbol representing that bit. This kind of conversion does not require strong computing power and can be easily calculated. A certain carrier wave frequency is chosen either up-front or during communication from a frequency range. When choosing that range, the characteristics of the communication system used would be taken into account. A carrier signal is chosen at a specific frequency (this applies to an AM embodiment). In some embodiments of the present invention, each bit is represented in the form of a whole-periodic (complete phase, hereinafter—"periodic") sinusoidal waveform, at the frequency of the carrier signal (200, FIG. 2A).

If the modulator and demodulator are operating in human voice frequencies (e.g. modem technology over an analog telephone line) then the chosen frequency of the carrier signal is preferably within the voice channel (for GSM voice channel, between 300 Hz to 3400 Hz). This frequency range is chosen so as to match the voice channel, aiming at resembling human voice for which the communication system is designed. A human voice typically has a fundamental frequency over long duration of times.

Figure 2B:
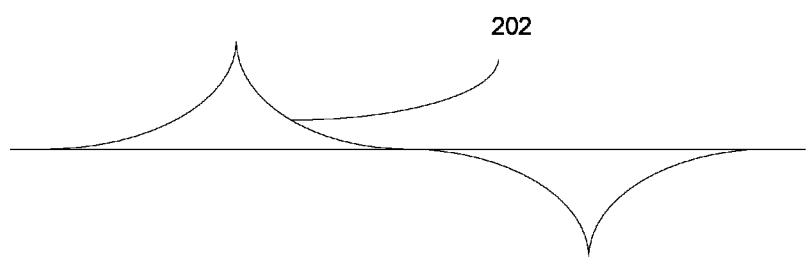
FIG. 2B illustrates another periodic waveform, for use as an analog representation symbol of a bit, according to some embodiments of the present invention.

In other embodiments of the present invention the symbol waveform may be of another periodic shape (e.g., other than sinusoidal) at the frequency of the carrier signal (202, FIG. 2B). In some embodiments of the present invention, any symbol waveform preferably that has a continuous and cyclic phase may be used.

The represented data, according to some embodiments of the present invention, is a variant of Amplitude Modulation—AM (or Frequency Modulation—FM, in a corresponding application). "1" and "0" bits are represented, according to some embodiments of the present invention, as a combinations of periodic waveforms of low, medium and high levels of amplitude, if modulating the amplitude of the carrier signal, or representing digital bits pertaining to the data as a combination of periodic waveforms of low, medium and high levels of frequencies, if modulating the frequency of the carrier signal.

Figure 3:
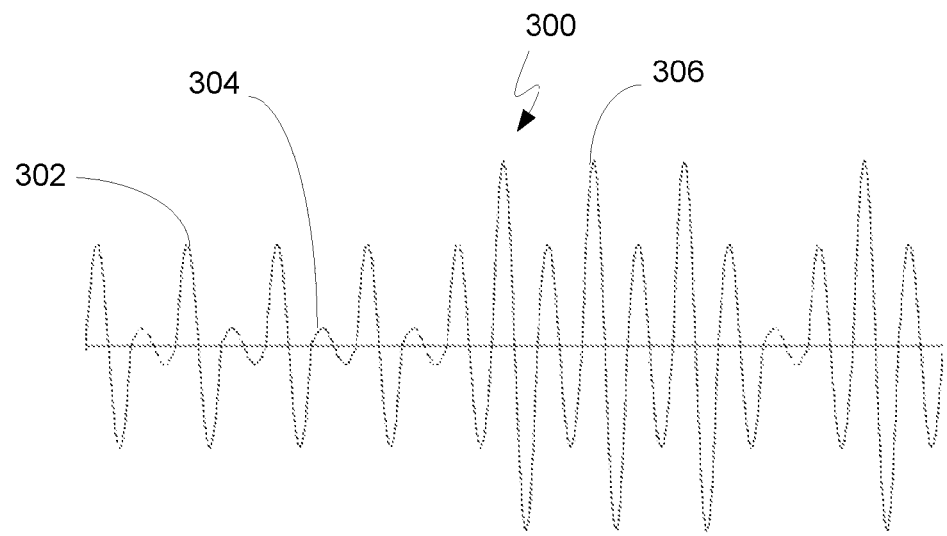
FIG. 3 illustrates an AM carrier signal with represented data, in accordance with some embodiments of the present invention.

According to some embodiments of the present invention, in order to distinguish between "1" bits from "0" bits, in AM applications, the amplitude (or frequency in FM applications) of the periodic waveform of "1" would have a greater (or smaller, in other embodiments)) amplitude (or frequency in FM applications) than the amplitude (or frequency) of an adjacent, preceding, periodic waveform symbol, whereas the amplitude (or frequency in FM applications) of the periodic waveform of "0" would have a smaller (or greater, in other embodiments)—typically much smaller (or much greater)—amplitude (or frequency in FM applications) than the amplitude (or frequency) of an adjacent, preceding, periodic waveform symbol. This is demonstrated in FIG. 3, depicting an AM carrier signal with represented data, in accordance with some embodiments of the present invention. When referring to classic amplitude modulation (or frequency modulation), each level of amplitude (or frequency) defines a specific symbol. The amount of bits represented in an AM (or FM) symbol equals to:

Log 2(AMOUNT OF DIFFERENT SYMBOL TYPES)

While the symbol-to-bit representation formula implies that the more levels one divides a given total amplitude dynamic range (or more frequency used), the bigger the amount of different symbols it gets and the more bits per symbol are present, hence also the more throughput is achieved. One must also bear in mind that the tradeoff when further dividing the total amplitude dynamic range (or further using more and more frequencies which are closer in the frequency domain) lies in the distance between each symbol to its neighbor, which becomes smaller and so the signal itself becomes more sensitive to noise. So when designing an AM modulation (or FM modulation) one must choose carefully the amount of levels (frequencies)/symbols used.

Suppose one wish to modulate a long sequence of bits using an already chosen AM (FM) modulation having a fixed amount of levels/symbols. If several consecutive bits happen to have identical value like "00000 . . . " or "11111 . . . " it is clear that just using the general AM modulation (FM modulation) rule mentioned above the modulator will quickly reach lowest/highest amplitude (frequency) and it will be impossible to continue to modulate the next consecutive bits properly. This is where trans-coding comes in handy.

Since at this stage the data is trans-coded, as described hereinabove, the data stream should contain no more than two consecutive zeros and no more than two consecutive ones, which eliminates the problem of too many consecutive bits having identical values. And so it is enough to define only three amplitudes levels for AM applications (or 3 frequencies for FM applications). This gives the modulated signal robustness against noises, but also limits bits per symbol and throughput.

FIG. 3 illustrates an AM carrier signal 300 with represented data, in accordance with some embodiments of the present invention. Three amplitude levels, low amplitude level 304, middle amplitude level 302 and high amplitude level 306 are combined to represent trans-coded data. In this figure, the symbol waveform representation signal 300 is modulated to represent the already trans-coded sequence "010101011010100110".

Figure 4:
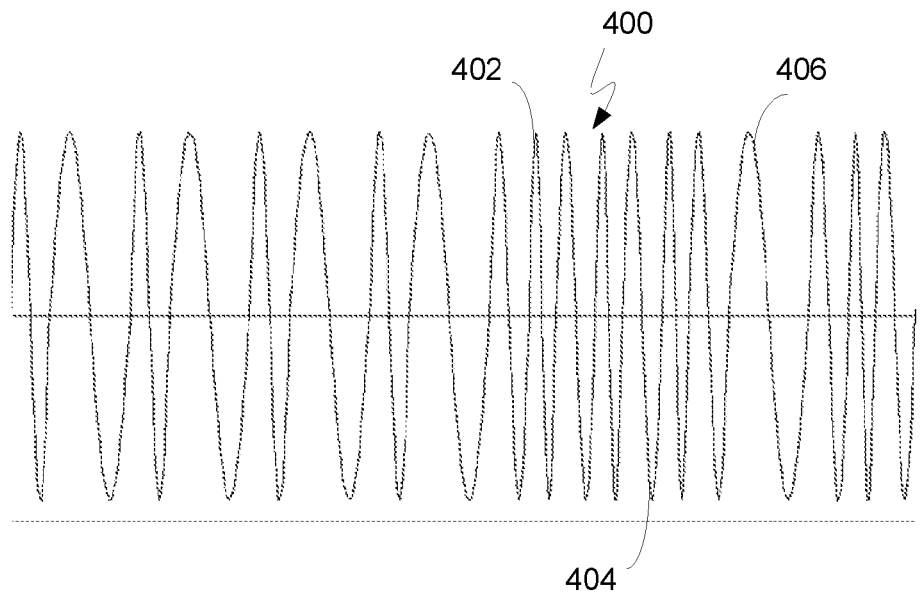
FIG. 4 illustrates a FM carrier signal with represented data, in accordance with some embodiments of the present invention.

FIG. 4 illustrates a FM carrier signal 400 with represented data, in accordance with some embodiments of the present invention. Three frequency levels, low frequency level 406, middle frequency level 404 and high frequency level 402 are used in combinations to represent trans-coded data. In this figure, the symbol waveform representation signal 400 is modulated to represent the same trans-coded sequence "010101011010100110".

Figure 5:
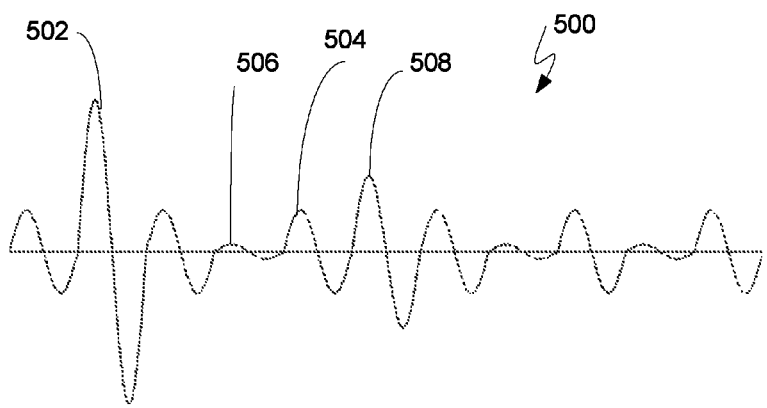
FIG. 5 illustrates an AM carrier signal with represented data, with a synchronizing signal as a preamble, in accordance with some embodiments of the present invention.

FIG. 5 illustrates an AM carrier signal 500 with represented data, with a synchronizing signal as a preamble, in accordance with some embodiments of the present invention. The synchronizing signal 502 has a distinctly high level of amplitude with respect to signal carrying the rest of the data. The preamble bit is represented by a forth amplitude level, which is distinctly different (in this example—distinctly higher) then the amplitude levels of the representations of the other data.

In some embodiments of the present invention, the modulation schema starts by providing a base-line signal with a mid-level amplitude (corresponding to mid-level frequency in FM applications). Generally, when the modulator encounters a new bit—according to the modulation rule explained hereinabove, if bit value is "1" it increases the amplitude to the next level, from low 506 to middle 504, or from middle 504 to high 508 (increasing frequency to a higher frequency in FM applications) and generates another periodic sinusoid waveform. If the new encountered bit is "0" the modulator decreases the amplitude level of the signal from high 508 to middle 504, or from middle 504 to low 506 (decreasing frequency to a lower frequency in FM applications) and generates another periodic sinusoid waveform. An exception is in case of using a distinctly high or low level of amplitude as a synchronizing preamble (or distinctly high or low frequency in FM applications), where upon encountering a value of "2" the amplitude is set the distinctly higher amplitude level, and when a "0" is encountered right after the preamble, the amplitude is set to the middle level (and not to the higher level), so as to allow encoding of the following data in the manner described hereinabove.

Finally, according to some embodiments of the present invention, the signal is enveloped. Enveloping as its name implies includes modifying the digital waveform symbols by multiplying it with a slowly varying envelope (slowly compared to the carrier frequency used). The shape of the envelope used may be selected from any continuous phase shape like sine wave or triangular wave, or any non continuous phase shape like chain-saw tooth. Enveloping is carried out, for example, in order to make the digital waveform symbols similar to real voice and by doing so overcome typical voice channel distortions related to VAD, DTX, CNG, AGC, EC and ANC, when using an audio signal as a carrier signal. The output of enveloping is digital waveform symbols.

At the receiving end, demodulation is performed by a demodulator, according to some embodiments of the present invention, and includes inverse steps corresponding to the data formation step and the data representation step performed by the modulator, and in the reversed order (de-representation first and then de-formation).

In the de-representation step, digital symbols of periodic sinusoid waveforms are converted into a formatted data bit stream. In general the conversion is done by comparing the amplitude (frequency in FM applications) of each periodic waveform with the amplitude (frequency in FM applications) of its preceding periodic waveform. If the amplitude (or frequency in FM applications) is smaller, then "1" is written into the bit stream of the retrieved data. If the amplitude (or frequency in FM applications) is greater or equal, then "0" is written into the bit stream of the retrieved data.

In FM applications, when determining the frequency of a certain periodic waveform compared with the previous one, a method of "up-sampling" may be used, followed by "zero crossing moving window search" over the stream of digital symbol samples in order to identify complete periods of waveforms, and separate each waveform and determine its frequency according to the amount of samples between zero crossing points. By doing so the process of conversion from symbols to bits is done in the Time domain only, which significantly lowers the amount of computational operations required by a processor.

When using a distinctly high (or low) level of amplitude (or frequency) for preamble bits, if the periodic waveform is not only bigger than the preceding one but also has very high amplitude a "2" will be written into the data bit stream.

Next, de-trans-coding is carried out, which is the inverse process to the trans-coding.

According to some embodiments of the present invention, the de-trans-coding rules are:

$$\begin{Bmatrix} 01 \to 0 \\ 10 \to 1 \\ \text{else} \to X/F \\ [20 \to P] \end{Bmatrix}$$

Applying these rules allow the target data stream to contain 0, 1, X, F, [P].

While the first two rules are exactly the inverse of the trans-coding rules, the third rule is meant to encounter errors. If, for some reason (e.g., due to distortions in the analog carrier channel, such as a voice channel) the data stream includes sequences of bits other than pairs of 01 or 10 (e.g., it may contain unwarranted sequences of 00 or 11), an error marker X/F is placed instead of 0 or 1, for the purpose of later resolving of the error. The choice between X/F depends on identifying this error and classifying it as a flip error (F) or as an insertion/deletion error(X).

Identification and classification of the type of error may be performed by a forward looking window function (which has a parametric size). The forward looking window function receives a bit stream, it checks the alignment of the bit stream with respect to the expected sequences (i.e., 01 or 10), and produces a score for that bit stream as measure of its alignment. The forward looking window function is called twice, once over a portion of the bit stream which starts at the first bit of the unwarranted sequence and once again over a portion of the bit stream starting at the second bit of the unwarranted sequence. The score of the two calls is compared. If the first call results in a greater or equal score with respect to the score of the second call then it means alignment was lost, and the error is classified as a flip error, hence an F is placed in the target stream, but if the second call results in a greater score then it implies that the error had caused a shift in alignment, attributing it either to an insertion or to a deletion of a bit and hence an X is placed it the target stream.

The last de-trans-coding rule relates to the case of using a synchronization preamble of a distinctly high level of amplitude where that rule is used to identify the preamble. When the bit pair "20" is detected it is de-trans-coded into P that represents a preamble bit (the "2" referring to a very high amplitude representation). When using a synchronization preamble of a distinctly high frequency the preamble is similarly identified.

Next the synchronization information is stripped off the data stream. As mentioned hereinabove synchronization information may include a special pattern in which case finding a synchronization sequence will be a simple search for the pattern in the data stream. In the present example the synchronization signal includes a distinctly high level of amplitude, and therefore a search for P in the data stream is carried out in order to find the synchronization information. Once found the synchronization information is disregarded in the next processing steps.

The processing from this step onwards is carried out on the payload and FEC bits extracted from the packet, as the remaining data is formatted that way (as shown in FIG. 1D).

The amount of errors in the remaining data packet is counted, if the error count is bigger than a maximal number of fixable errors per packet (which relates to the properties of the FEC used), or bigger than a predetermined number of errors, the packet is considered "unrecoverable" and dropped, otherwise a two-phase iterative process of (1) guessing the missing or erred bit content and fixing the packet accordingly, and (2) checking the validity of the fixed packet, is carried out. The "guessing" phase simply includes substituting each error with new bit option that matches the identified type of that error (i.e. X or F bits). The "checking" phase includes de-stuffing (removing the "pattern breaking" control bits which were placed during stuffing from each packet, see FIG. 1D and corresponding description hereinabove), de-interleaving (the inverse action of interleaving, see FIG. 1C and corresponding description hereinabove) and checking of the FEC information.

The iterative process continuous as long as the checked FEC information returns a 'false' value in the validity check, and it stops when encountering one of the following conditions: a) the checked FEC information returns a 'true' value in the validity check—in that case the packet is considered to be successfully extracted, or b) all bits options combinations have been tried to no avail—in that case the packet is considered "unrecoverable" and is discarded.

The validity check typically includes calculating the forward error correction for the extracted packet and comparing it with the FEC information that was received for that packet. If both are equal, the validity check returns TRUE, else FALSE is returned.

The last step involves aggregation of the data of the packet payloads into a single stream of data.

Figure 6:
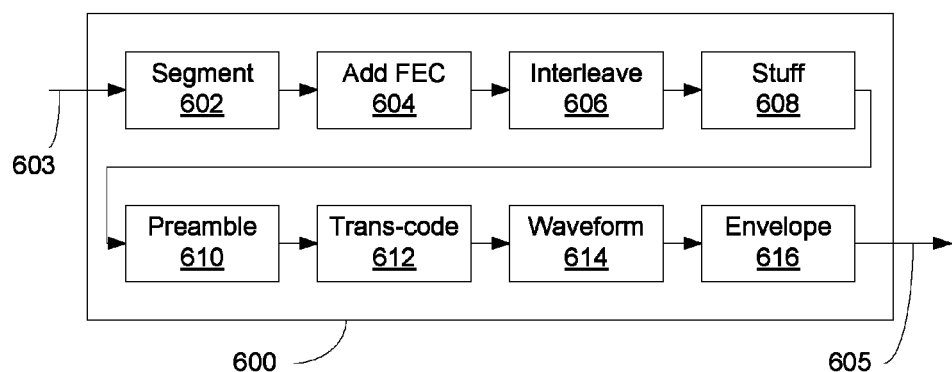
FIG. 6 illustrates schematically the functional modalities of a modulator, according to some embodiments of the present invention.

FIG. 6 schematically illustrates the functional modalities of a modulator 600, according to some embodiments of the present invention. Modulator 600 is basically designed to perform data formation and data representation, in accordance with some embodiments of the present invention. Data formation is performed over the input data stream 603 of bits at the modulator and produces a formatted data stream of bits. Data representation is performed at the modulator (after the data formation) over the formatted data stream of bits and produce digital symbols.

Modulator 600, according to some embodiments of the present invention, is configured to segment 602 an incoming data stream 603 into payloads of data, add FEC information 604 to the payloads, interleave 606 each payload with its corresponding FEC information, stuff 608 the interleaved payloads and FEC data, add a preamble 610 as a synchronizing signal, transcode 612 the data, form 614, for each data bit of the transcoded data, a periodic waveform corresponding to that bit. According to some embodiments of the present invention the modulator is configured to produce digital sinusoid waveform symbols at a certain sample rate, preferably higher than the voice channel sample frequency (8 KHz), if a voice channel is used. Choosing a certain sample rate together with the fact that the carrier frequencies are set to be constant allows the usage of a look-up table—(an array of precalculated values) for symbols representation instead of online calculation and may thus substantially reduce calculations.

The modulator 600 is further configured to add an envelope 616 to the outgoing signal 605, in accordance with the modulation manner described hereinabove.

Figure 7A:
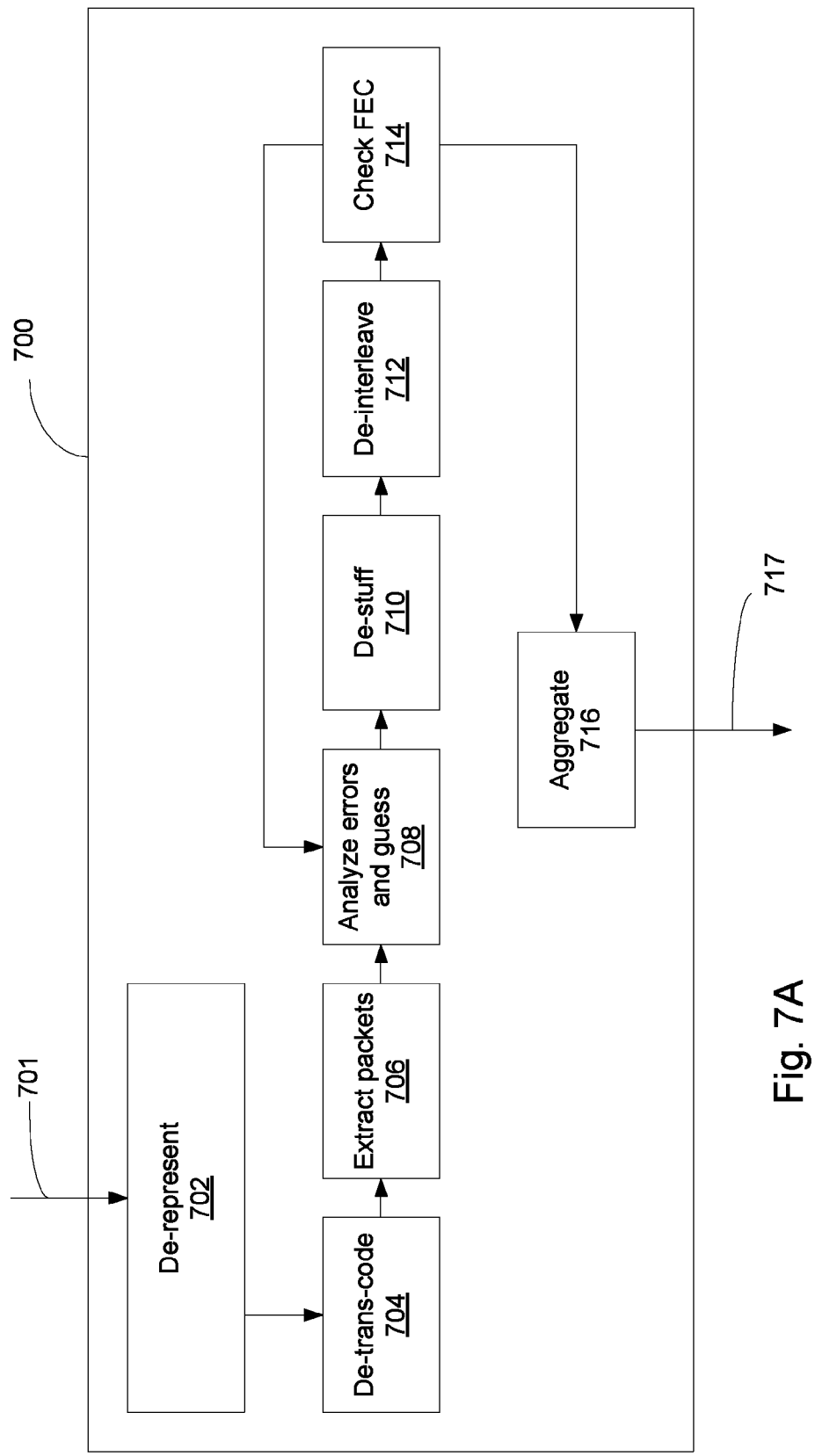
FIG. 7A illustrates schematically the functional modalities of a demodulator, according to some embodiments of the present invention.

FIG. 7 schematically illustrates the functional modalities of a demodulator 700, according to some embodiments of the present invention.

Demodulator 700 is configured to de-represent 702 a received incoming signal 701 into a digital stream, de-transcode 704 the digital stream, extract 706 data packets based on detected synchronization bits, analyze errors by guessing 708, de-stuff 710 each packet, de-interleave 712 the packet to extract the payload of that packet, and check 714 FEC to verify the validity of that payload. If the payload is verified it is aggregated 716 with other previously verified payloads into an outgoing continuous data stream 717. If the payload is not verified another guess is performed to fix suspected errors and the newly fixed packet undergoes de-stuffing 710, de-interleaving 712 and verifying (by checking FEC 714—calculating FEC for that packet and comparing it with the received FEC information). If the packet is found valid it is aggregated 716 into the outgoing continuous data stream 717 and the next packet is processed. If all possibilities of guesses of the content of the packet fail the validity check the packet is discarded and the next packet is processed.

In some embodiments of the present invention demodulator 700 is configured, upon reception of the incoming signal 701 to up-sample the waveforms and then convert the samples into bits.

As opposed to voice content (when voice channel is used), which is sensitive to delays (and hence cannot utilize retransmission to improve reliability) but is less sensitive to packet drops, data content transmission is often very sensitive to packet drops, and less sensitive to delays. When transferring non-voice data content, according to some embodiments of the present invention, backward error correction mechanism (e.g., automatic repeat request—ARQ) may be employed, so that any packet losses due to distortions in the voice channel are overcome by retransmission. The extra information required for ARQ is provided in a header of each packet.

Figure 7B:
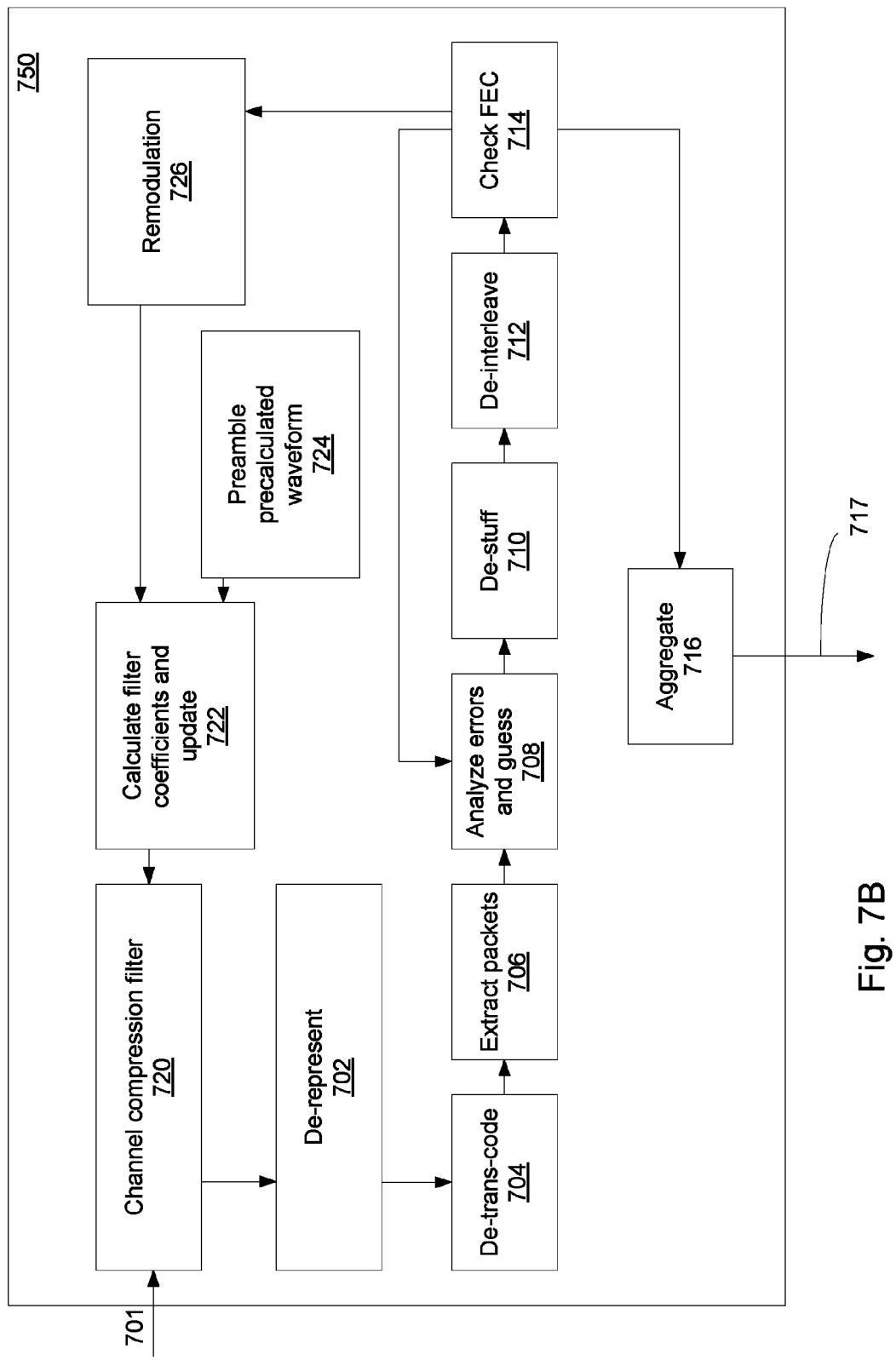
FIG. 7B illustrates schematically the functional modalities of a demodulator, according to some embodiments of the present invention.

FIG. 7B illustrates schematically the functional modalities of a demodulator 750, according to some embodiments of the present invention. In some embodiments of the present invention, a filter may be applied by demodulator 750 when up-sampling before converting the received signal into digital bits. The purpose of the filter is to address (compensate and counteract as much as possible) any distortions introduced by the analog (e.g. voice) channel. The filter may be an adaptive filter whose filtering characteristics (e.g., coefficients) are re-calculated 722 constantly and repeatedly updated in the following manner: a known data sequence is modulated and transmitted by the modulator. The demodulator generates a prediction of the ideal modulation expected waveform symbols 724 for that known data sequence for use as a reference. The reference is compared to the actual received waveform symbols of the known data at the demodulator. New filter coefficients—representing the channel distortion—are then calculated 722 and then updated based on the comparison. Such known data may be, for example, the preamble of each packet, in which case the comparison will be triggered after each successful synchronization of a preamble of a packet. In addition once the data of a packet is successfully retrieved (FEC validity check result is TRUE) the packet bits may be remodulated 726 in order to extract ideal waveform symbols for that packet. The ideal waveform symbols of a packet may be compared with the received waveform symbols of that packet and from this comparison new filter coefficients will be calculated 722 and then updated. In the later manner the filter coefficients will be updated continuously. The above mentioned functionalities of filtering and filter coefficients updating come at the expense of demodulator complexity and processing time.

A modulator and a demodulator, according to some embodiments of the present invention, may be embodies separately (e.g., a modulator for modulating transmitted data and a separate demodulator for demodulating received modulated data) or jointly (e.g., a modem for modulating transmitted data and demodulating received data).

Some embodiments of the present invention may have an appeal and may be used in commercial applications.

Current POS (Point of sale) terminal devices are developed with the aim of utilizing mobile communication devices (e.g., cellular phones, smartphones) as means for payment. Various techniques are known with regards to how a POS terminal interfaces mobile communication devices and how billing information of the consumer is transferred to the POS terminal. Such techniques may raise interoperability issues, since some mobile communication devices support those techniques while others do not. Some techniques require the mobile communication device to store sensitive information, placing the consumer at a potential risk of unlawful use in case of theft. User experience and ease of operation are also aspects which not all techniques equally address.

Aspects of the present invention involve the introduction of simple, secure and low-cost ways of interfacing any mobile communication device for transaction of customer billing information by utilizing the audio interface of the mobile.

Figure 8:
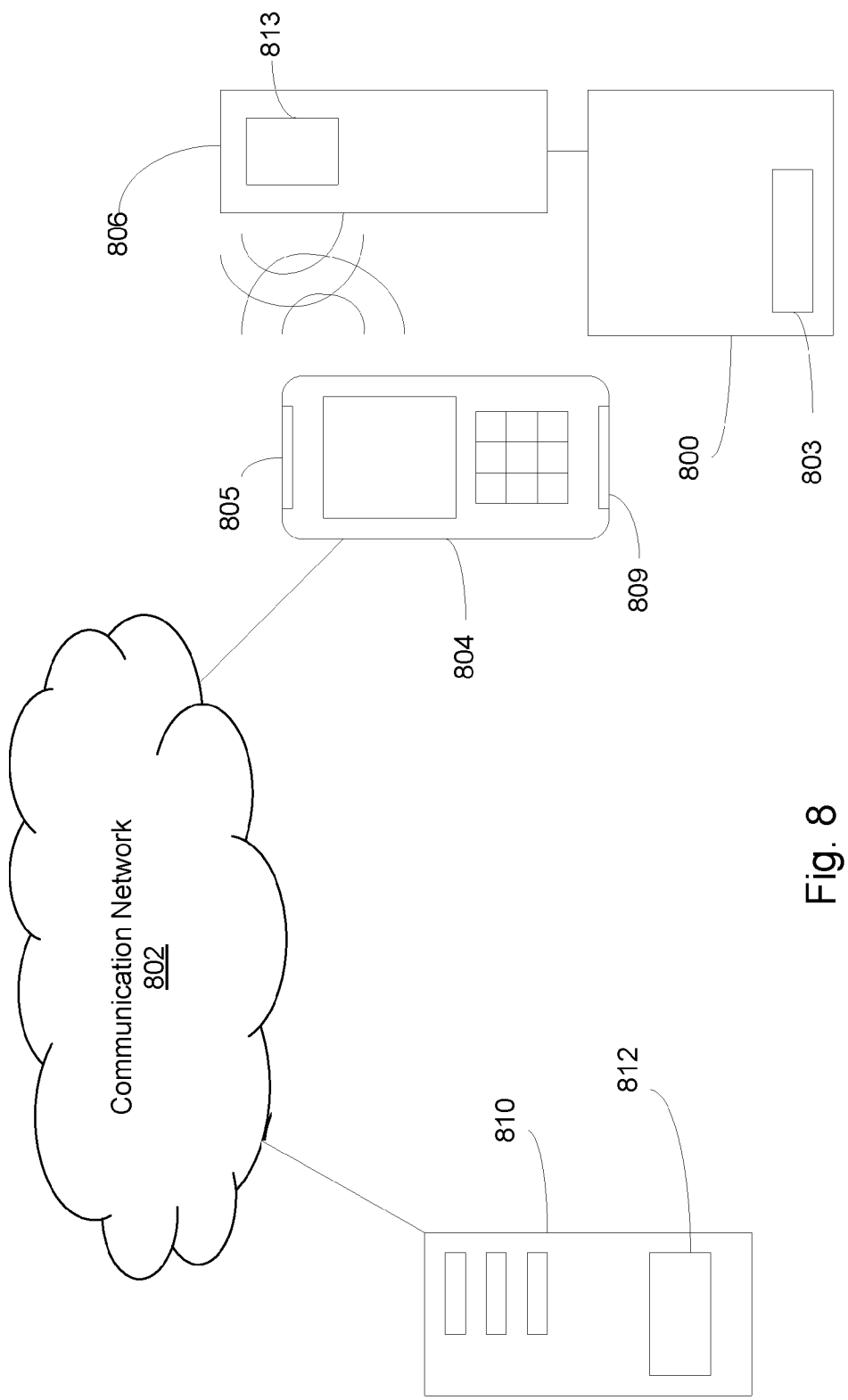
FIG. 8 illustrates a system for secured transactions, according to some embodiments of the present invention, involving a mobile communication device.

FIG. 8 illustrates a system for secured transactions, according to some embodiments of the present invention, involving a mobile communication device 804. Such system may include a dedicated server 810. Server 810 may be associated with an Interactive Voice Response (IVR)/call center of a credit supplier, a clearing house or the like, a bank or the like.

Server 810 includes a modulator (or a transceiver acting both as a modulator and a demodulator) 812, for modulating secured data, such as, for example authentication information (e.g., identity of one or more of the parties to the transaction, confirmation of the transaction).

A customer may decide to purchase a product or a service at a POS 800. In order to perform the transaction by paying using a mobile communication device 804 that is owned or otherwise associated with that client, (e.g., a cellular phone), a voice link may be established between a server 810 and POS 800 through mobile communication device 804, using a voice call or VoIP call, on which the modulated secured data may be transmitted in the form of an audio signal serving as a carrier signal on which the modulated secured data is carried, in a manner according with some embodiments of the present invention, over the communication network 802, and played at the POS 800, using speaker 805 of mobile communication device 804.

POS 800 is designed to receive the modulated secured data using a modem 806 that includes an audio transducer 813 (e.g., a microphone and in some embodiments also a speaker) for receiving the played audio signal with the modulated secured data, and demodulating the received modulated secured data, in a manner in accordance with some embodiments of the present invention. POS 800 may include input interface 803, such as a keyboard, pointing device, touch screen, etc., or a combination thereof.

In some embodiments of the present invention modem 806 may be embodied in the form of a dongle.

According to some embodiments of the present invention bidirectional communication may be established between server 810 and POS 800. In some embodiments the bidirectional communication is full duplex communication. Modulated data, in accordance with some embodiments of the present invention may be generated by modem 806, in its modulator role, which may carried by an audio signal played by speaker 813 and picked up by microphone 809 of mobile communication device 804 of the customer. The audio signal with the modulated data may then be transmitted over the communication network 802 to demodulator 812 and decoded at the server 810.

Figure 9:
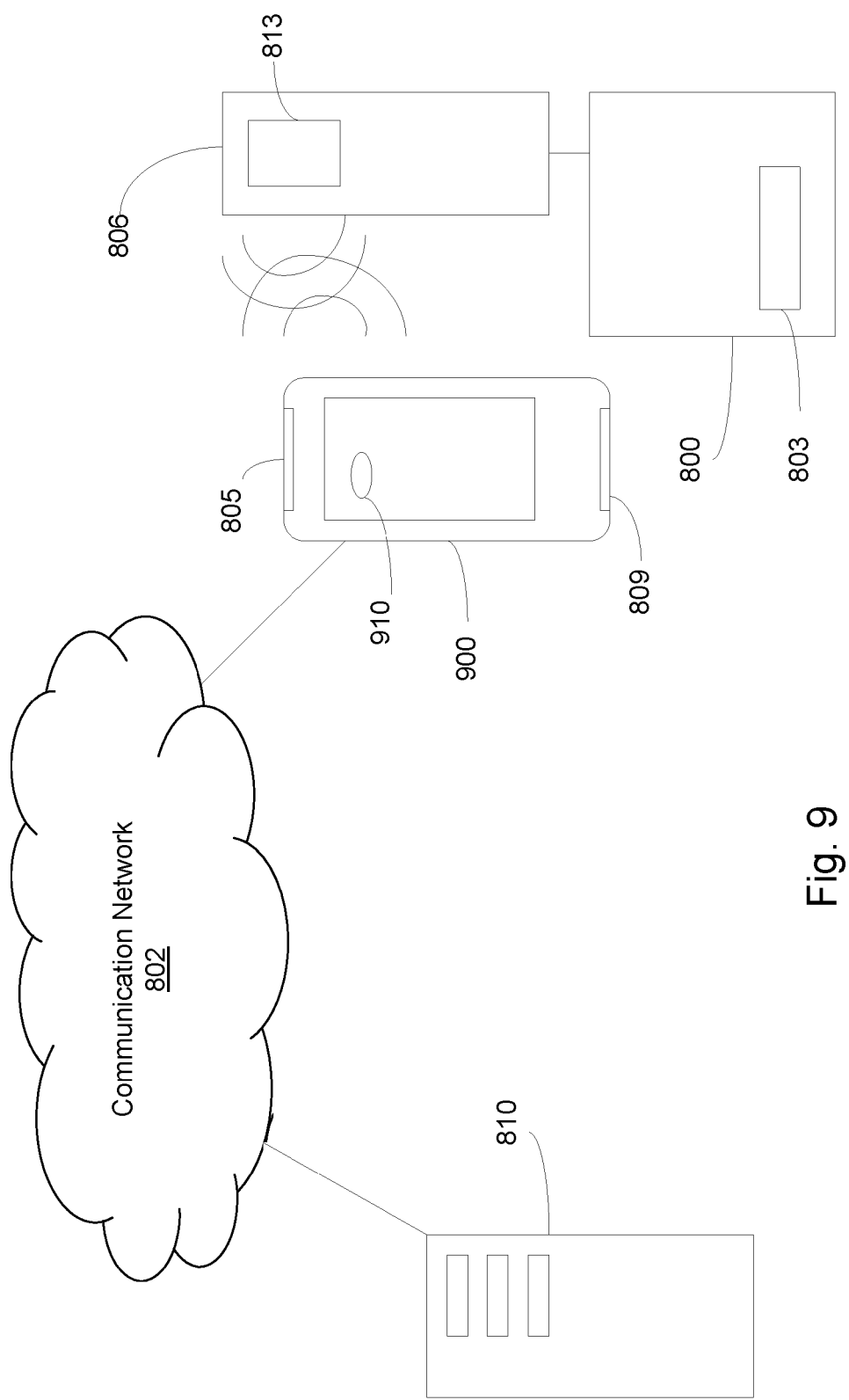
FIG. 9 illustrates a system for secured transactions, according to some embodiments of the present invention, involving a smartphone or a tablet.

FIG. 9 illustrates a system for secured transactions, according to some embodiments of the present invention, involving a smartphone (or tablet) 900. In this example, the modem that was associated with server 810 in the example depicted in FIG. 8, is now embodied in smartphone 900, which includes a dedicated application 910 installed on it. Application 910 uses speaker 805 and microphone 809 to receive or transmit, respectively, a modulated audio signal. The application 910 is designed to activate the smartphone as a modem, communicating with modem 806 of POS 800.

In some embodiments of the present invention, the customer may be required to register his mobile communication device with a service provider (e.g., associated with server 810. Registration may be managed by application 910 installed on a smartphone (see FIG. 9) or via a voice channel (e.g., a voice call, or VoIP call) to an IVR/call center associated with server 810 (feature phone).

When a billing transaction is required the customer may call a dial number of an IVR/call center associated with server 810 (in a scenario as depicted in FIG. 8) or activate a smartphone application (in a scenario as depicted in FIG. 9). The customer may be required to enter a unique identity code (e.g., a PIN code) on input interface 803 of the POS 800 or on the mobile communication device 804. The customer then places the mobile communication device 804, or the smartphone 900 within a hearing distance with respect to the modem 806 of POS 800.

POS 800 may thus interacts securely with server 810 either over an IP connection, or other communication link, managed by application 910 of the smartphone 900 and from it through modem 806 of POS 800, or over a voice channel using the mobile communication device 804 audio interface (microphone 809 and speaker 805) to communicate with modem 806 of POS 800. A confirmation of the transaction may be thus successfully obtained, allowing the customer to complete the transaction on the spot.

Figure 10A:
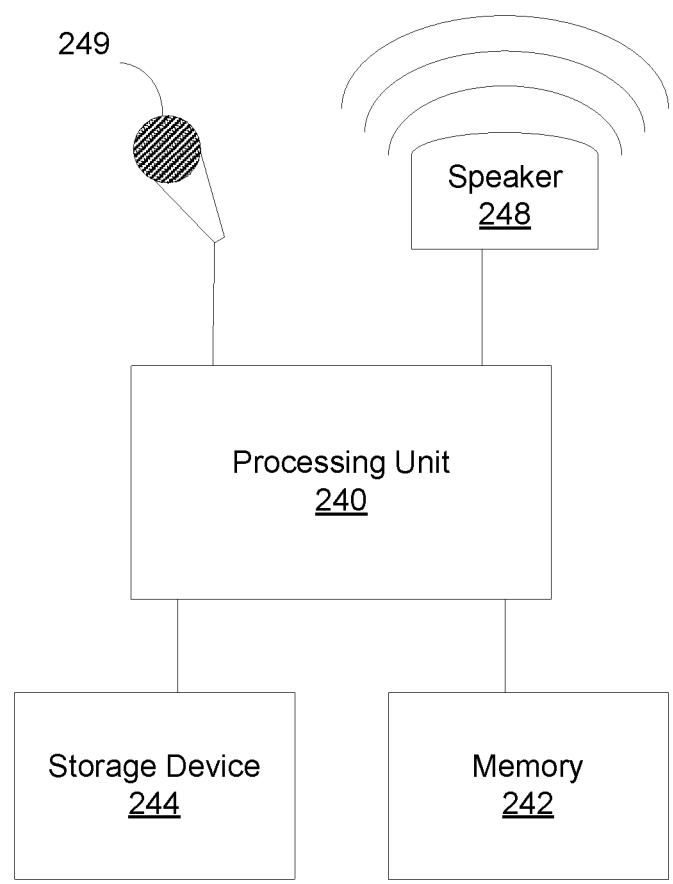
FIG. 10A illustrates a modem for use in communication of digital data on an analog signal, according to some embodiments of the present invention.

FIG. 10A illustrates a modem for use in communication of digital data on an analog signal, according to some embodiments of the present invention. The modem may include a microphone 249 for receiving an audio signal carrying digital data, in a manner according to some embodiments of the present invention, and a speaker 248 for generating such audio signal carrying digital data. The modem includes a processing unit for processing a received audio signal by demodulating it and retrieving the digital data, and for processing digital data to be transmitted by modulating it and generating an audio signal on which the digital data is carried, in a manner according to some embodiments of the present invention.

Figure 10B:
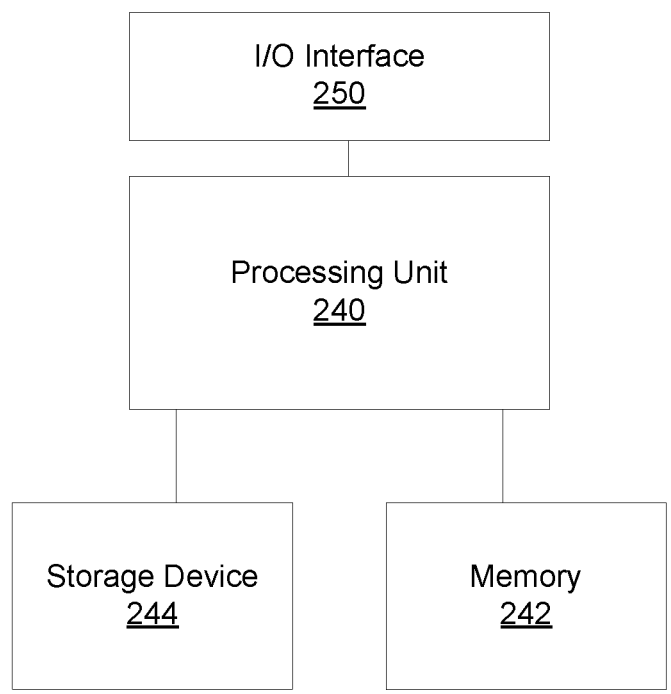
FIG. 10B illustrates a modem for use in communication of digital data on an analog signal, according to some other embodiments of the present invention.

FIG. 10B illustrates a modem for use in communication of digital data on an analog signal, according to some other embodiments of the present invention. Here, instead of a microphone and/or a speaker, an Input/Output (I/O) interface 250 is used. This may be for example in the case when modulation and/or demodulation is carried out on a device separate from the receiving device (e.g., microphone) and/or form the transmitting device (e.g., speaker) and is designed to receive an electronic signal that was picked by a microphone and/or to generate an electronic signal that would be used to activate a speaker to generate an audio signal.

According to some embodiments of the present invention, transmission of data is subjected to communication security aimed at addressing and containing various security threats involved in mobile authentication, such as, for example, theft of client information during transaction, theft of mobile phone itself, theft by malicious merchants as well as others, protection against middleman attacks, replay attacks, brute force attacks and other threats.

Any communication between a smartphone and a server may be performed via a secured data channel (e.g. Secure Socket Layer—SSL). During a transaction secured data communication between a mobile communication device of a user and a server according to some embodiments of the present invention provides a robust method for authenticating a user's mobile phone with the server. The information swapped while a mobile device is transacting with another mobile device or while a mobile device is transacting with a server is 2 separate (independent) One Time Password (OTP) keys. The swap of the 2 OTP keys provides a robust and secure method for authenticating interacting mobile phones.

According to some embodiments of the present invention, communication of digital data over an analog channel (e.g. voice channel) may be bidirectional and/or full duplex, which can prevent or greatly eliminate the risk of re-play attacks. The digital data communicated is constantly changing, which also increases invulnerability against re-play attacks. Using a communication method in accordance with some embodiments of the present invention allows avoiding storing sensitive user information on the communication mobile device of that user, thus eliminating or greatly reducing the risk of unwarranted communication of secured data (e.g., unauthorized transactions) caused by theft of the user's mobile communication device. When conducting a transaction using a communication method according to some embodiments of the present invention there is no need to share sensitive user information (e.g., the user's PIN code, bank account details, etc.) with the POS or other third party, thus substantially increasing the security of the transaction and its invulnerability to fraudulent actions.

Some embodiments of the present invention are suitable for commercial transactions such as, for example, receiving or paying money or using virtual cards for commercial transactions.

Figure 11:
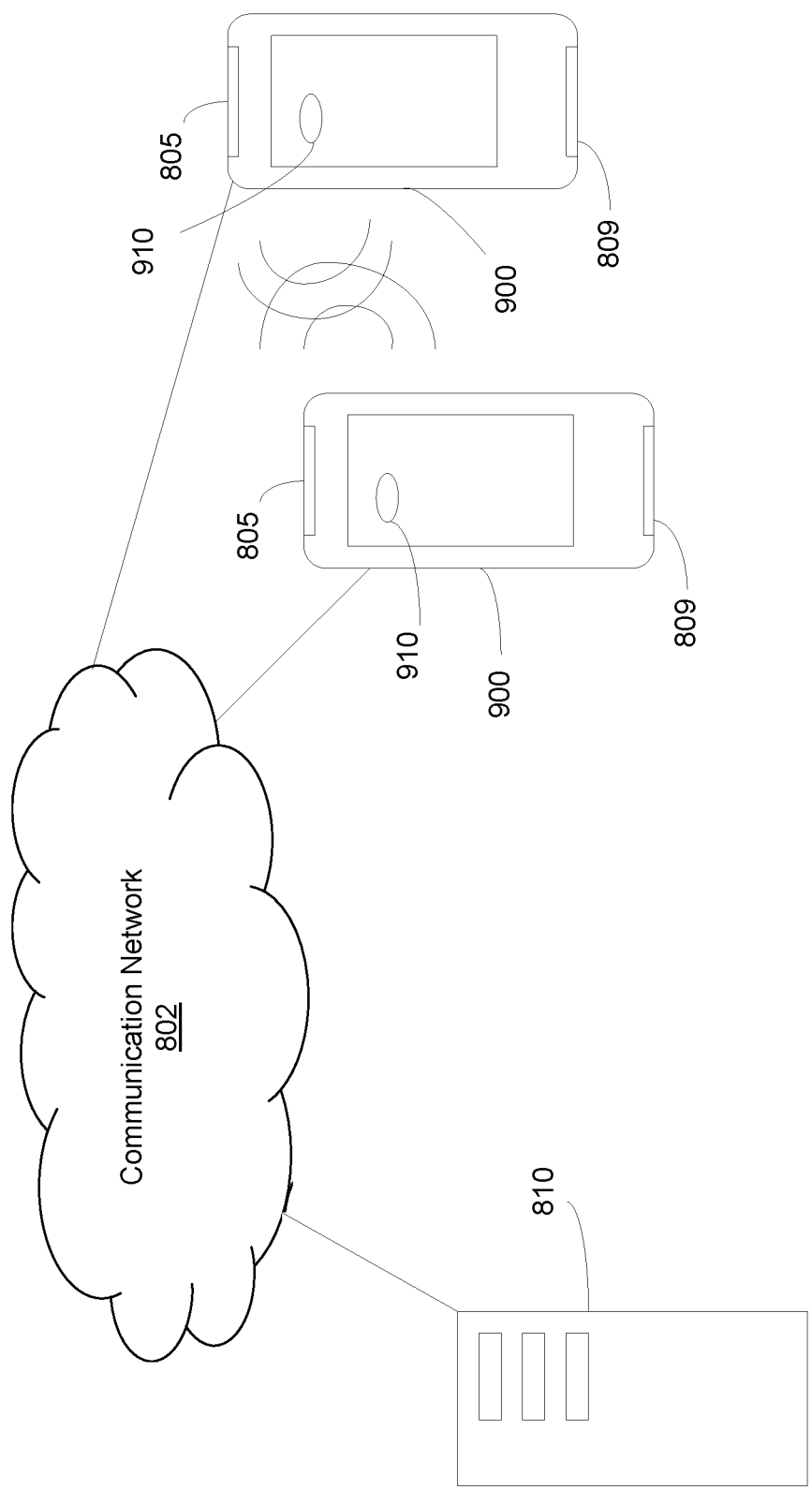
FIG. 11 illustrates a system for secured transactions in which parties to the transaction use, each, a mobile communication device, each communicating with a dedicated server in accordance with some embodiments of the present invention.

FIG. 11 illustrates a system for secured transactions in which parties to the transaction use, each, a mobile communication device 900, each communicating with a dedicated server in accordance with some embodiments of the present invention.

Each party to the transaction uses a smartphone 900. A model is embodied in each smartphone 900, which includes a dedicated application 910 installed on it. Application 910 uses speaker 805 and microphone 809 to receive or transmit, respectively, a modulated audio signal. The application 910 is designed to operate the smartphone as a modem.

The steps below describe application of a system and method according to some embodiments of the present invention, when two parties perform a transaction. The parties to the transaction use, each, their mobile communication devices 900, to communicate with a dedicated server 810 (e.g., a bank, a credit provider, a clearing house, etc.), in accordance with some embodiments of the present invention. Note that in the present description when describing an action or actions performed by either of the parties, it is generally meant that the mobile communication device of that party performs that action or these actions.

First each party undergoes authentication by sending identity information (e.g., user name and PIN code to the server, communicating this data in a manner according to embodiments of the present invention (e.g., as described hereinabove) to the server. When a party is authenticated by the server 810 that party is cleared to perform transactions in that session.

Each user may initiate the transaction (e.g., by pressing a "start transaction" button on its smartphone screen, or otherwise) in no particular order between the parties, meaning it does not matter who is first. One of the parties, or both, would indicate the amount of that transaction (e.g., a merchant would enter the amount to pay before starting the transaction).

The server 810 identifies each party for that transaction, and generates for each party a unique password key (e.g., 128 bit Random OTP—One Time Password), and stores it as a key for that user in that session. The password key is valid for a party only for a single transaction and also only for a short predetermined period of time. If the window of time has elapsed ("transaction timeout" occurred) but still no positive "double OTP check" has occurred at the server for that party, and for the current transaction, the key and the transaction would expire immediately. In case of expiry the transaction will be canceled by the server 810 and the parties (or one of them) would be notified. Whenever a transaction is canceled or failed the generated password key for that party is erased and is no longer valid.

After generating the key the server then securely transmits to that user its own generated unique key (e.g., OTP Key). Thus each party uses a unique key that is valid for that party only.

After the two parties receive their keys they swap the keys using their smartphone as audio interfaces. Each party securely transmits the key which it received from the other party to the server 810.

When server 810 receives a key from a certain party ("hereinafter—the first party) that key is stored in a database as a "received" key for that party, and then the server 810 perform a "double key check".

In a "double OTP check" the server searches in its stored database for a second party whose "generated" key matches the "received" key of the first party. If no such party is found a message is transmitted from server 810 to the first party indicating the transaction as failed. If a second party who's "generated" key matches the "received" key of the first party, the server waits (e.g., for a predetermined period of time) to receive from the second party its received key. At this point two scenarios may happen. In the first scenario, the second party sends a received key to the server which is different than the "generated" key of the first party in which case the server transmit a message to first party indicating the transaction as failed. In the second scenario, the second party sends a received key to the server which matches the "generated" key of the first party in which case the "double key check" result is positive, and the server may then proceed to execute the transaction (e.g. perform payment from the first party to the second party or vice versa) and transmit a message to the parties confirming a successful transaction.

Systems and methods, according to some embodiments of the present invention may be applied to substitute the use of physical cards (e.g., credit cards, debit cards, tickets, club membership cards, coupon, parking tickets, train tickets, employee cards, attendance cards, business cards, etc.)

Employing systems and methods according to some embodiments of the present invention involve many advantages: manufacturing and maintenance costs are substantially reduced or eliminated, a mobile communication device is owned by a large proportion of the public, which lends it as a readily available tool for transactions, the need to carry physical cards is avoided, self tailored virtual card may be specifically tailored by integrating Mobile SDK technology.

Some embodiments of the present invention may be provided in the form of a system, a method or a computer program product. Similarly, some embodiments may be embodied as hardware, software or a combination of both. Some embodiments may be embodied as a computer program product saved on one or more non-transitory computer readable medium (or mediums) in the form of computer readable program code embodied thereon. Such non-transitory computer readable medium may include instructions that when executed cause a processor to execute method steps in accordance with examples. In some examples the instructions stores on the computer readable medium may be in the form of an installed application and in the form of an installation package.

Such instructions may be for example loaded into one or more processors and executed.

For example, the computer readable medium may be a non-transitory computer readable storage medium. A non-transitory computer readable storage medium may be, for example, an electronic, optical, magnetic, electromagnetic, infrared, or semiconductor system, apparatus, or device, or any combination thereof.

Computer program code may be written in any suitable programming language. The program code may execute on a single computer, or on a plurality of computers.

Examples are described hereinabove with reference to flowcharts and/or block diagrams depicting methods, systems and computer program products according to examples.

Features of various examples discussed herein may be used with other embodiments discussed herein. The foregoing description of the embodiments has been represented for the purposes of illustration and description. It is not intended to be exhaustive or to be limiting to the precise form disclosed. It should be appreciated by persons skilled in the art that many modifications, variations, substitutions, changes, and equivalents are possible in light of the above teaching.

The invention claimed is:

1. A method for transmitting digital data on an analog signal, the method comprising modulating amplitude or frequency of the analog signal in a manner that includes representing each digital bit of the digital data as a combination of periodic waveforms of low, medium and high levels of amplitude, if modulating the amplitude of the analog signal, or representing each digital bit of the data as a combination of periodic waveforms of low, medium and high levels of frequencies, if modulating the frequency of the analog signal, wherein "1" is represented by a change in the amplitude or frequency levels in a first direction, whereas "0" is represented by a change in the amplitude or frequency levels in a second direction which is opposite to the first direction.

2. The method of claim 1, further comprising transcoding the digital data that includes converting each bit of the digital data into two bits.

3. The method of claim 2, wherein the transcoding comprises converting "0" to "01" and converting "1" to "10".

4. The method of claim 1, further comprising arranging the digital data in packets, each of the packets including a payload and FEC information.

5. The method of claim 1, further comprising arranging the digital data in packets and adding a synchronization preamble to each packet of the digital data.

6. The method of claim 5, comprising representing the preamble in a uniquely distinct modulation pattern.

7. The method of claim 6, wherein the uniquely distinct modulation pattern comprises a representation symbol of a distinctly different amplitude than the low, medium and high levels of amplitude, or a distinctly different frequency than the low, medium and high levels of frequency.

8. The method of claim 6, wherein the uniquely distinct modulation pattern comprises a sequence of bits that is unlikely to occur in the representation of the digital data.

9. The method of claim 1, further comprising demodulating the modulated analog signal to extract the digital data.

10. A method for retrieving digital data that was transmitted on an analog signal whose amplitude or frequency was modulated in a method according to claim 1, the retrieving method comprising demodulating the modulated analog signal to extract the digital data.

11. The method of claim 10, further comprising analysing and fixing errors in the extracted data.

12. The method of claim 11, further comprising identifying and classifying the errors using a forward looking window function.

13. The method of claim 10, further comprising guessing missing or erred bit content in a packet of the extracted data, fixing the packet accordingly and performing a validity check of the fixed packet.

14. The method of claim 13, wherein the validity check is based on FEC information.

15. The method of claim 10, further comprising:
estimating channel response over time to different frequencies of the received signal;
using a filter, filtering the modulated analog signal to compensate for distortion based on the estimated channel response.

16. The method of claim 15, further comprising:
receiving a modulated known reference sequence;
generating a prediction modulation of the known reference sequence;
performing a comparison of the received modulated known reference sequence with the prediction modulation; and
updating characteristics of the filter based on the comparison.

17. The method of claim 15, further comprising:
determining successful receipt of a retrieved packet or a part thereof of the modulated data;
remodulating the retrieved packet or a part thereof;
performing a comparison of the retrieved packet with the remodulated retrieved packet; and
updating characteristics of the filter based on the comparison.

18. A modulator configured to perform a method according to a claim 1.

19. A demodulator configured to perform a method according to claim 10.

\* \* \* \* \*